United States Patent [19]

Bell, Jr. et al.

[11] 4,303,957

[45] Dec. 1, 1981

[54] GAP CONDITION SENSING CIRCUIT FOR ELECTRICAL DISCHARGE MACHINING POWER SUPPLY

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 52,403

[22] Filed: Jun. 27, 1979

[51] Int. Cl.³ .......................... H02H 3/20; B23K 9/16
[52] U.S. Cl. ...................................... 361/88; 361/86; 219/69 S
[58] Field of Search .................. 361/88, 92, 86, 93; 219/69 S, 69 R, 69 C, 69 M, 69 P, 69 G; 324/54

[56] References Cited

U.S. PATENT DOCUMENTS

| | | | |
|---|---|---|---|
| 3,705,969 | 12/1972 | Bell, Jr. | 219/69 S |
| 3,717,741 | 2/1973 | Verner | 219/69 S X |
| 3,746,930 | 7/1973 | Best et al. | 361/86 |
| 3,775,578 | 11/1973 | Verner | 219/69 C |
| 3,793,502 | 2/1974 | Bell, Jr. | 219/69 C X |
| 3,825,713 | 7/1974 | Bell, Jr. | 219/69 S X |

Primary Examiner—Patrick R. Salce
Attorney, Agent, or Firm—Harry R. Dumont

[57] ABSTRACT

A protection system circuit which senses and responds to abnormal gap voltage condition. The circuit is operable in either positive or negative polarity of the gap. The circuit includes two branches, one relating to positive gap polarity and the other to negative polarity. The appropriate one of the two branches is selected by enabling one of two comparators in the respective branches.

11 Claims, 1 Drawing Figure

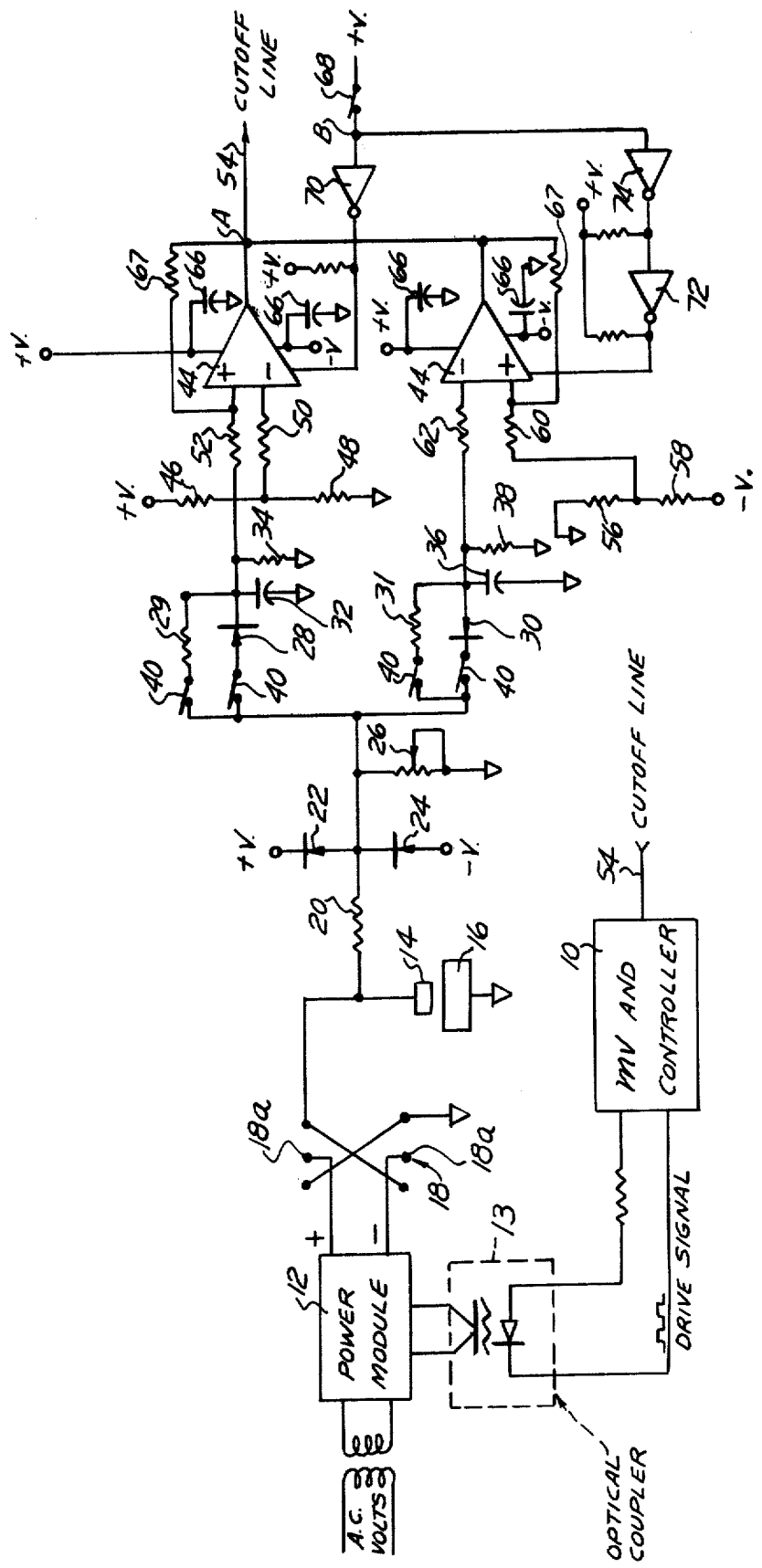

GAP CONDITION SENSING CIRCUIT FOR ELECTRICAL DISCHARGE MACHINING POWER SUPPLY

BACKGROUND OF THE INVENTION

Systems are known in the electrical discharge machining art in which electrical gap parameters, most often average gap voltage or gap peak voltage, are responded to when these are of an abnormal level to provide interruption of the power supply or reduction of its power output. Electrical discharge machining power supplies must have the capability of being operated in either standard polarity with the electrode negative and workpiece positive or, in reverse polarity in which the electrode is positive and the workpiece negative. This choice is made depending on the particular materials used for the workpiece and the electrode.

Protection circuits used in the power supply must be readily adaptable to changeover between the two gap polarities. In the prior art, a number of relay switching systems have been used. One example of such a system is described and shown in U.S. Pat. No. 3,775,578 issued to Dalton R Verner on Nov. 27, 1973 for "Polarity Reversal System for Electrical Discharge Machining Apparatus". Another solution has been to take signals of the two polarities, amplify these and then pass the signals through a relatively complicated absolute value circuit.

SUMMARY OF THE INVENTION

It will be seen that the sensing circuit according to the present invention is operable to receive a signal from the gap of either polarity and to pass it through one of two separate, duplicate branches for processing and then comparison with an adjusted reference voltage. A gating system is used to activate and "gate" either one of the two branches corresponding to the polarity the machine is set for.

BRIEF DESCRIPTION OF THE DRAWINGS

The present invention, its operational features and its advantages and advancements will be understood from the following specification together with the drawings in which like numerals are used to refer to like parts where they occur and wherein the drawing is a combined block diagrammatic and schematic drawing of the invention.

DETAILED DESCRIPTION OF THE PREFERRED EMBODIMENT

The drawing shows the basic parts of an EDM machining power supply which include a multivibrator and controller stage 10, a power module 12 and an opticoupling stage 13. The power module 12 shown is of the floating type and includes a power source and at least one output electronic switch for providing the machining power pulses to the gap. The gap is shown with a tool electrode 14 and a workpiece 16. To provide for reversing this polarity at the gap, there is included a reversing switch 18. Responsive to the leftward or rightward movement of the intermediate contact 18a on the upper and lower sides of the switch, the positive output terminal will be connected either to the electrode or to the workpiece.

The portion of the circuit to the right of the gap includes the sensing circuit for sensing gap voltage and for comparing it to a preset reference voltage. The gap voltage signal passes through a resistor 20 and is then clamped to either a plus or minus voltage level depending on the preset polarity of the gap. A pair of clamping diodes 22 and 24 are included in the circuit. A potentiometer 26 is connected in the circuit to provide a cut-off level adjustment.

Beyond the potentiometer 26 there are included in the circuit two branches, the upper branch being rendered operative for positive polarity electrode and the lower branch being rendered operative for negative electrode polarity. To provide this operation the upper input diode 28 and the lower input diode 30 are poled as shown. A capacitor 32 and a discharge resistor 34 are included in the upper branch while a capacitor 36 and a discharge resistor 38 are included in the lower branch.

A plurality of switches 40 are included in each branch as shown. By operating switches 40 in the upper branch it is possible to switch out the diode 28 and switch in a resistor 29 to change the sensing circuit to an average voltage rather than a peak voltage sensing circuit. Operation of the corresponding switches 40 in the lower branch, in the same manner, can be used to switch in a resistor 31 in place of the input diode 30 thus making it an average voltage sensing network.

The next following major element in both the upper and lower branches is a comparator 44. With respect to the upper branch a reference voltage level is preset by two resistors 46, 48 and a plus voltage source. Series resistor 50 is connected to the lower input terminal of the comparator 44. The arc voltage sensed, either peak or average, is passed through a series resistor 52 to the upper input terminal of the comparator 44. If the arc voltage provided at the upper input terminal of the comparator 44 drops below the reference voltage on its lower input terminal, the output of the comparator 44 will go to ground. This will provide a cut-off signal to the cut-off line 54 and use it to interrupt or reduce the output from the multivibrator 10 at the lower left-hand side of the circuit. A number of systems are known for providing cut-off of a multivibrator responsive to cut-off signal. Among these are U.S. Pat. No. 3,825,713 issued to Oliver A. Bell, Jr. on July 23, 1974 for "Function Control Circuit for EDM Power Supply", and U.S. Pat. No. 3,705,969 issued to Oliver A. Bell, Jr. on Dec. 12, 1972 for "Cut-Off Protective System for Electrical Discharge Machining Power Supply". Both the aforementioned patents are of common ownership herewith.

There is provided in the lower branch a similar arrangement of a comparator 44 with a negative voltage source and a pair of resistors 56, 58 used to set the voltage level which is passed through a resistor 60 and to the lower terminal of the associated comparator 44. A series resistor 62 is also included in circuit with the upper input terminal that receives the arc voltage signal.

Suitable grounding capacitors 66 and shunt resistors 67 are connected in circuit as shown. A control input signal is used to enable the upper or the lower comparator 44. This enabling signal is provided by a switch 68 and an inverter 70 in the upper branch and series inverters 72, 74 in the lower branch. If the polarity control signal coming in through switch 68 is of a positive voltage level, for example, a positive 5 volts, then the upper or positive electrode signal branch is enabled. If, on the other hand, switch 68 is open and a zero voltage signal is provided as an input to the inverters 70 and 74, then the lower comparator 44 is enabled and the lower or negative electrode branch is rendered operative. It will be understood that input control signals of similar levels can be provided from a microprocessor or like input control device to point B.

It will thus be seen that the circuit provided by our invention operates with a single input and a single output but is capable of being operated on both gap polarities. It is further operable at either average gap voltage signal level or in the gap peak voltage sensing mode according to the manual selection of the operator.

We claim:

1. A gap condition sensing network for use in an EDM protection system including:
   a power module;
   a pulse generator operatively connected to said module for providing machining power pulse output therefrom to the EDM gap;
   a reversing switch operatively connected between the power module and the gap for providing pulse output of negative or of positive polarity thereto; whereby the improvement comprises a sensing network having a single input lead coupled to the gap and a clamping means for clamping the plus and the minus voltage excursions;
   a pair of branches coupled to the output of said clamping means, the first of said branches including a peak voltage sensing network and a first comparator having a pair of input terminals, said comparator having the output of said peak voltage sensing network and a reference voltage network coupled to its two respective input terminals;
   said first comparator further having its output terminal connected to a cut-off signal line;
   a second branch substantially similar to the first branch wherein its peak voltage sensing network is of opposite polarity to that of said first branch; said comparator of the second branch having a pair of input terminals and having its reference voltage and gap peak voltage sensing network connected to its two respective input terminals;
   said comparators both having their outputs connected to a common terminal; and
   a means for enabling the operation of one of said comparators whereby a control cut-off signal is passed from such common terminal to reduce power output to the gap.

2. The combination as set forth in claim 1 wherein said pulse generator comprises a multivibrator and an opticoupling network is connected intermediate said power module and said multivibrator.

3. The combination as set forth in claim 1 wherein a gain adjustment potentiometer is coupled to the output of said clamping network.

4. The combination as set forth in claim 1 wherein a further pair or resistor-capacitor networks are included, each switchable into one of said two branches, respectively, for providing average gap voltage signal to furnish an input to said comparators and wherein a further switching means is operably connected for switching said peak voltage sensing networks from said branches.

5. The combination as set forth in claim 1 wherein said enabling means comprises a control input signal source; said control input signal source being coupled through a single inverter stage to one of said comparators for enabling such comparator responsive to one polarity input and being connected through a pair of series inverter stages to the other of said comparators for enabling it responsive to opposite polarity input.

6. A gap condition sensing network for use in an EDM protection system including a power module; a multivibrator operatively connected to said module for providing machining power pulse output therefrom to the EDM gap; a reversing switch operatively connected between the output of the power module and the gap for providing pulse output of negative or positive polarity thereto; wherein the improvement comprises, a gap voltage sensing network having a single input lead connected to the gap; a pair of branches coupled to the output of said lead; the first of said branches including a voltage sensing network and a first comparator, said comparator having the output of said gap voltage sensing network and a reference voltage network coupled to its two respective input terminals; said first comparator further having its output terminal connected to a cut-off signal terminal; a second branch substantially similar to the first branch but having a gap voltage sensing network operative responsive to opposite polarity signal to that of said first branch; said comparator of the second branch having its reference voltage and gap voltage network connected to its input terminals; said comparators both having their outputs connected to said cut-off signal terminal; and means for enabling the operation of one of said comparators whereby control cut-off signal is passed from such common terminal to reduce power output from the power module.

7. The combination as set forth in claim 6 wherein said sensing networks comprise a diode and capacitor for sensing gap peak voltage.

8. The combination as set forth in claim 6 wherein said sensing networks comprise a resistor-capacitor network for sensing average gap voltage.

9. The combination as set forth in claim 6 wherein a clamping means is operably connected to the output of said sensing means lead for clamping the extent of the plus and the minus voltage excursions to substantially equal values.

10. The combination as set forth in claim 9 wherein a gain adjustment potentiometer is coupled to the output of said clamping means.

11. The combination as set forth in claim 6 wherein said enabling means comprises a control input signal source; said control input signal being coupled to a first inverter stage for enabling one of said comparators responsive to input of one polarity and to a pair of series inverter stages connected to the other of said comparators for enabling it responsive to opposite polarity input.

* * * * *